(12) United States Patent
Higley (10) Patent No.: US 11,307,360 B2
(45) Date of Patent: Apr. 19, 2022

(54) DUAL INTERLOCKING SHUTTER SYSTEM FOR A FIBER OPTIC CONNECTOR AND ADAPTER

(71) Applicant: US Conec, Ltd, Hickory, NC (US)

(72) Inventor: Jason Higley, Hickory, NC (US)

(73) Assignee: US Conec, Ltd., Hickory, NC (US)

( * ) Notice: Subject to any disclaimer, the term of this patent is extended or adjusted under 35 U.S.C. 154(b) by 0 days.

(21) Appl. No.: 16/961,511

(22) PCT Filed: Jan. 17, 2019

(86) PCT No.: PCT/US2019/013957
§ 371 (c)(1),
(2) Date: Jul. 10, 2020

(87) PCT Pub. No.: WO2019/143786
PCT Pub. Date: Jul. 25, 2019

(65) Prior Publication Data
US 2020/0341209 A1 Oct. 29, 2020

Related U.S. Application Data

(60) Provisional application No. 62/618,193, filed on Jan. 17, 2018.

(51) Int. Cl.
*G02B 6/38* (2006.01)
(52) U.S. Cl.
CPC ......... *G02B 6/3849* (2013.01); *G02B 6/3825* (2013.01)
(58) Field of Classification Search
CPC .............................. G02B 6/3849; G02B 6/3825
See application file for complete search history.

(56) References Cited

U.S. PATENT DOCUMENTS 5,363,460 A * 11/1994 Marazzi ............... G02B 6/3825
385/55
5,687,268 A 11/1997 Stephenson et al.
6,039,585 A * 3/2000 Kim ................... H01R 13/5219
385/139

(Continued)

FOREIGN PATENT DOCUMENTS

EP 0800100 A1 10/1997
EP 3855226 A1 7/2021
WO 2019143786 A2 7/2019

OTHER PUBLICATIONS

International Search Report and Written Opinion for International Patent Application No. PCT/US2019/013957 dated Jul. 24, 2019, 9 pages.

*Primary Examiner* — Sung H Pak
(74) *Attorney, Agent, or Firm* — Michael L. Leetzow, P.A.; Shubhrangshu Sengupta (57) ABSTRACT

A fiber optic connector has a fiber optic connector shutter that rotates about a first axis and an adapter for the fiber optic connector also has an adapter shutter that rotates about a second axis in the adapter. When the fiber optic connector and the adapter are mated to one another, the axes for the fiber optic connector shutter and the adapter shutter are aligned and the fiber optic connector shutter and the adapter shutter rotate about a single axis. The fiber optic connector shutter and the adapter shutter include structure to maintain engagement during the mating and un-mating of the fiber optic connector and the adapter.

16 Claims, 12 Drawing Sheets

(56) References Cited

U.S. PATENT DOCUMENTS

| | | | |
|---|---|---|---|
| 6,081,647 A | 6/2000 | Roth et al. | |
| 6,142,676 A | 11/2000 | Lu | |
| 7,785,018 B2 | 8/2010 | Jones et al. | |
| 8,870,466 B2 * | 10/2014 | Lu | G02B 6/3807 385/58 |
| 9,927,584 B2 | 3/2018 | Leigh et al. | |
| 2003/0002816 A1 * | 1/2003 | De Marchi | G02B 6/3849 385/78 |
| 2005/0147358 A1 | 7/2005 | Zaina et al. | |
| 2018/0149813 A1 | 5/2018 | Yang et al. | |

* cited by examiner

DUAL INTERLOCKING SHUTTER SYSTEM FOR A FIBER OPTIC CONNECTOR AND ADAPTER

This application claims priority of U.S. Provisional Patent Application Ser. No. 62/618,193, filed on Jan. 17, 2018, the contents of which are incorporated by reference.

BACKGROUND OF THE INVENTION

Field of the Invention

Installation and removal of fiber optic connectors from adapters usually present a problem with dust and debris contaminating the front faces of the fiber optic connectors (the fiber optic ferrule in particular). As a result, many providers have used shutters on either the fiber optic connectors, the adapter, or a combination thereof. However, many of these solutions have shutters that allow dust and debris to be swept into any area of connection of the fiber optic connectors, thereby introducing into the connection the dust and debris that was previously outside the connector. In many cases, the shutters in adapters swing inward when contacted by the fiber optic connector. Any dust and debris on the adapter shutter maybe picked up as the fiber optic connector engages and/or passes by the shutter. So while the shutter may initially keep dust and debris away from the fiber optic connector, it is easy to transfer dust and debris on the unprotected shutter surfaces during insertion and/or removal.

Applicant has a new design for a fiber optic connector shutter and adapter shutter that function in unison to trap any dust and debris between the shutters.

SUMMARY OF THE INVENTION

The present invention is directed to a shutter for a fiber optic connector, the fiber optic connector having a shroud disposed at the front end thereof and includes a fiber optic connector shutter rotatably mounted to the shroud about a first axis, the fiber optic connector shutter having an outer surface and an inner surface, the outer surface having an outer surface plane and the inner surface having an inner surface plane, and a notch in the fiber optic connector shutter, the notch having an outer portion extending forward from the outer surface beyond the outer surface plane and a corresponding inner indentation extending into the fiber optic connector shutter forward of the inner surface plane.

In some embodiments, the notch engages a portion of an adapter shutter in an adapter into which the fiber optic connector is inserted.

In some embodiments, a portion of a connector housing engages the fiber optic connector shutter to rotate the fiber optic connector shutter when the connector housing moves relative to a shroud.

In some embodiments, the fiber optic connector shutter and the adapter shutter rotate about the same axis as the fiber optic connector is inserted into the adapter.

In some embodiments, the fiber optic connector shutter and the adapter shutter are adjacent to one another and move together when the fiber optic connector and adapter are mated.

In another aspect, the invention is directed to a shutter system to prevent dust from entering a fiber optic connector and an adapter that includes a fiber optic connector shutter rotatably mounted to the fiber optic connector, the fiber optic connector shutter rotatable about a first axis, and an adapter shutter rotatably mounted to the adapter, the adapter shutter rotatable about a second axis, the fiber optic connector shutter and adapter shutter being adjacent to one another and moving together when the fiber optic connector and adapter are mated.

In some embodiments, the first axis and the second axis align along a rotation axis when the fiber optic connector and adapter are mated.

Some embodiments include a shroud, the shroud disposed at the front end of the fiber optic connector and the fiber optic connector shutter is rotatably attached to the shroud.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description of the present embodiments of the invention, and are intended to provide an overview or framework for understanding the nature and character of the invention as it is claimed. The accompanying drawings are included to provide a further understanding of the invention, and are incorporated into and constitute a part of this specification. The drawings illustrate various embodiments of the invention, and together with the description serve to explain the principles and operations of the invention.

DETAILED DESCRIPTION OF THE PREFERRED EMBODIMENTS

Reference will now be made in detail to the present preferred embodiment(s) of the invention, examples of which are illustrated in the accompanying drawings. Whenever possible, the same reference numerals will be used throughout the drawings to refer to the same or like parts.

Applicant notes that the term "front" or "forward" means that direction where the fiber optic connector would meet with another fiber optic connector or device, while the term "rear" or "rearward" is used to mean the direction from which the optical fibers enter into the fiber-optic ferrule or fiber optic connector. Thus, "front" is that part of the fiber optic connector or adapter is where the shutters are located. The "rear" or "back" is the opposite side for the fiber optic connectors. In the case of the adapters, if there are two shutters, then the rear or back is the portion between the two fronts. However, the adapter may be shown as having only one entrance for a fiber optic connector and then the rear or back would be the opposite end. Applicant also notes that the term "adjacent" is used herein to mean that the two components are next to one another with no intervening objects. However, the two components may or may not be contiguous or touching one another. Thus, there may be some space between the objects and they will still be adjacent as long as no other object (excluding air and dust particles) comes between the two components.

One embodiment of a shutter system 100 to prevent dust from entering a fiber optic connector 102 and an adapter 104 is illustrated in the figures. The shutter system 100 includes a fiber optic connector shutter 110 and an adapter shutter 112. As explained in more detail below, the fiber optic connector shutter 110 engages the adapter shutter 112 as the fiber optic connector 102 is inserted into the adapter 104. The two shutters move together, preferably about a common axis, thereby locking dust and debris therebetween, which are pushed out of the way by the fiber optic connector 102 as it is inserted into the adapter 104.

Figure 2:
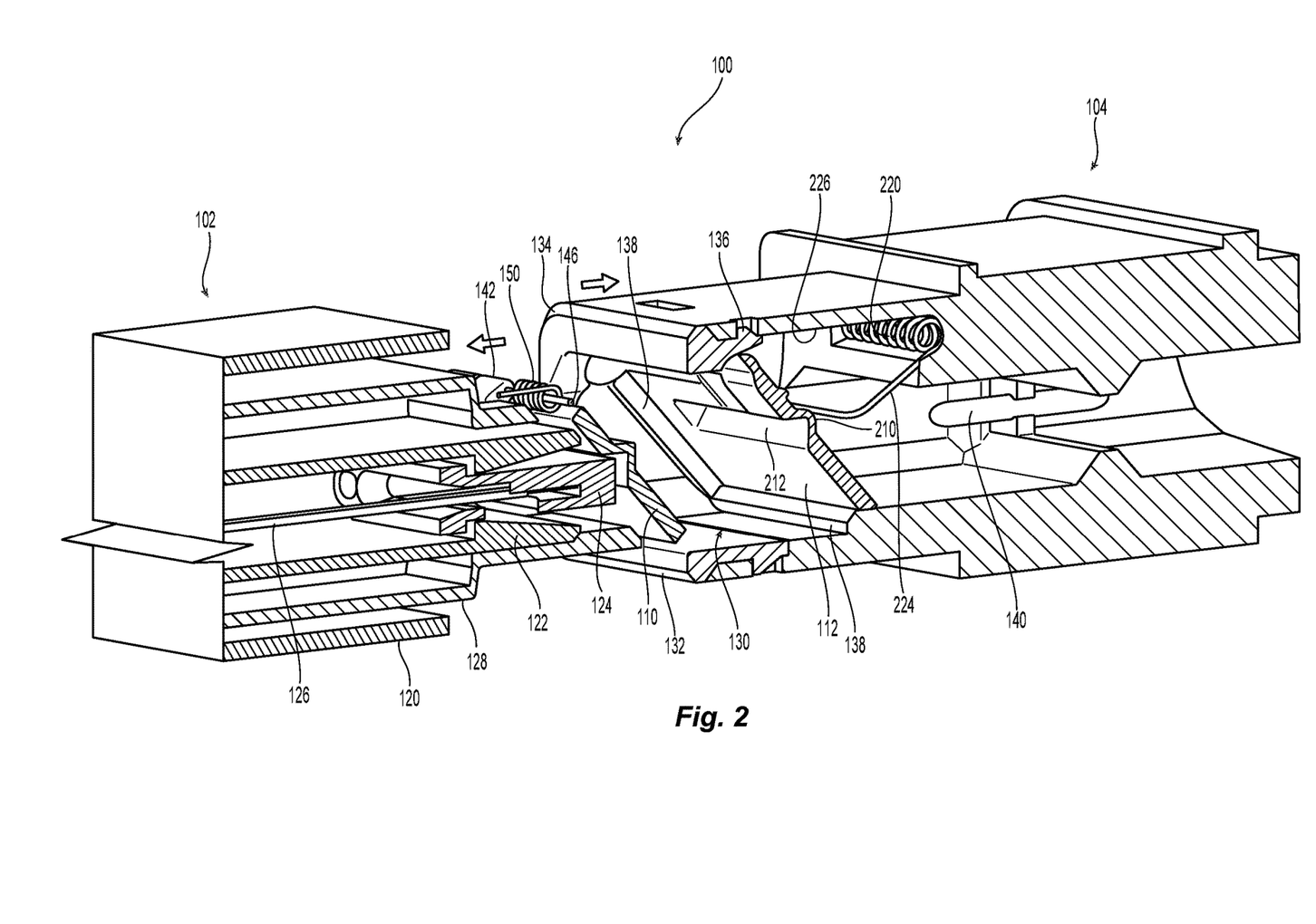
FIG. 2 is a cross sectional view of the fiber optic connector and adapter in FIG. 1.

The fiber optic connector 102 preferably includes an outer housing 120 and an inner housing 122 that contains a fiber optic ferrule 124. See, e.g. FIG. 2. The fiber optic ferrule 124 holds the optical fibers 126, which are secured therein. The fiber optic connector 102 may also include a shroud 128 that is disposed between the outer housing 120 and the inner housing 122. The fiber optic connector 102 may include other parts that are not explicitly illustrated or discussed herein. For example, there may be a spring to bias the fiber optic ferrule 124, a spring push, a crimp body, etc.

The adapter 104 has an opening 130 at the front end 132 to receive the fiber optic connector 102. As is known in the art, a second fiber optic connector may be inserted into the adapter 104 from an opposite end to mate with the fiber optic connector 102. The adapter 104 may also include a chamfered front portion 134 to assist in aligning the fiber optic connector 102 with the adapter 104. The chamfered front portion 134 may be removable (using tabs 136 to connect with the adapter 104), permanently attached, or integral with the remainder of the adapter 104. The adapter 104 may have other structures that assist in the mating of the fiber optic connector 102 with the adapter 104. For example, there may be adapter stop surfaces 138 in the opening 130 of the adapter 104 (see, e.g., FIGS. 1, 2, and 5), guide pins 140 (FIG. 2), and/or other alignment and stop features.

Turning now to the shutter system 100 and fiber optic connector 102, the shroud 128 has shroud pivot sleeves 142, preferably two shroud pivot sleeves 142, that are spaced apart. There are also shutter pivot sleeves 144 on the fiber optic connector shutter 110 that are also spaced apart, the shroud pivot sleeves 142 being disposed between the two shutter pivot sleeves 144. However, it is also possible that the shutter pivot sleeves 142 are between the shroud pivot sleeves 140. A pin 146 passes through openings 148 of the sleeves, 142,144 and defines a first axis A of rotation for the fiber optic connector shutter 110 on the shroud 128. A spring element 150 is disposed around the pin 146 and engages a shroud tab 152 with one end 154 thereof and the second end 156 of the spring element 150 is inserted into a shutter door opening 158 (FIG. 5) on the fiber optic connector shutter 110. It should be understood that other spring elements 150 could be used and could engage the shroud 128 and the fiber optic connector shutter 110 in other ways and still fall within the scope of the present invention.

Figure 1:
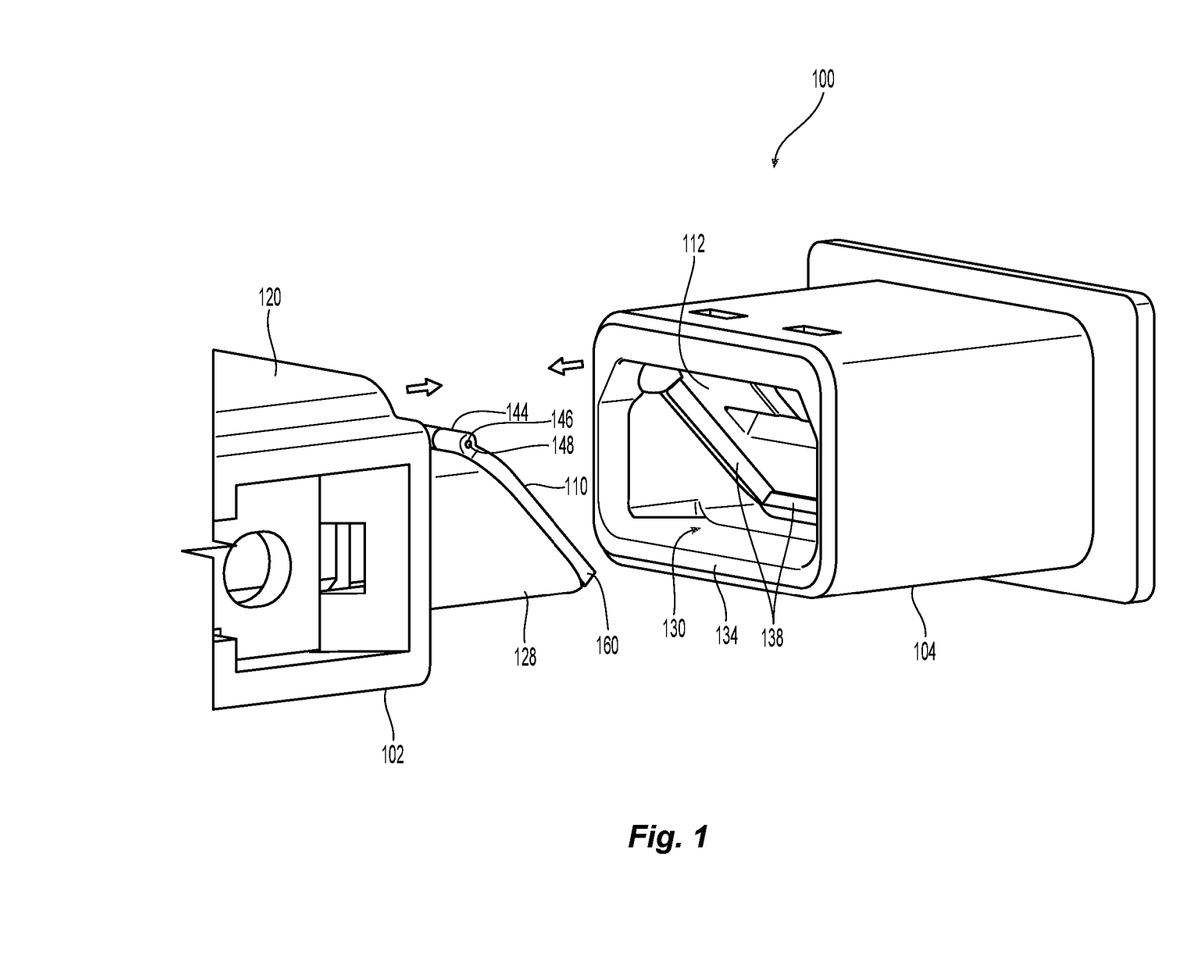
FIG. 1 is a perspective view of one embodiment of a fiber optic connector and adapter with shutters according to the present invention.
Figure 5:
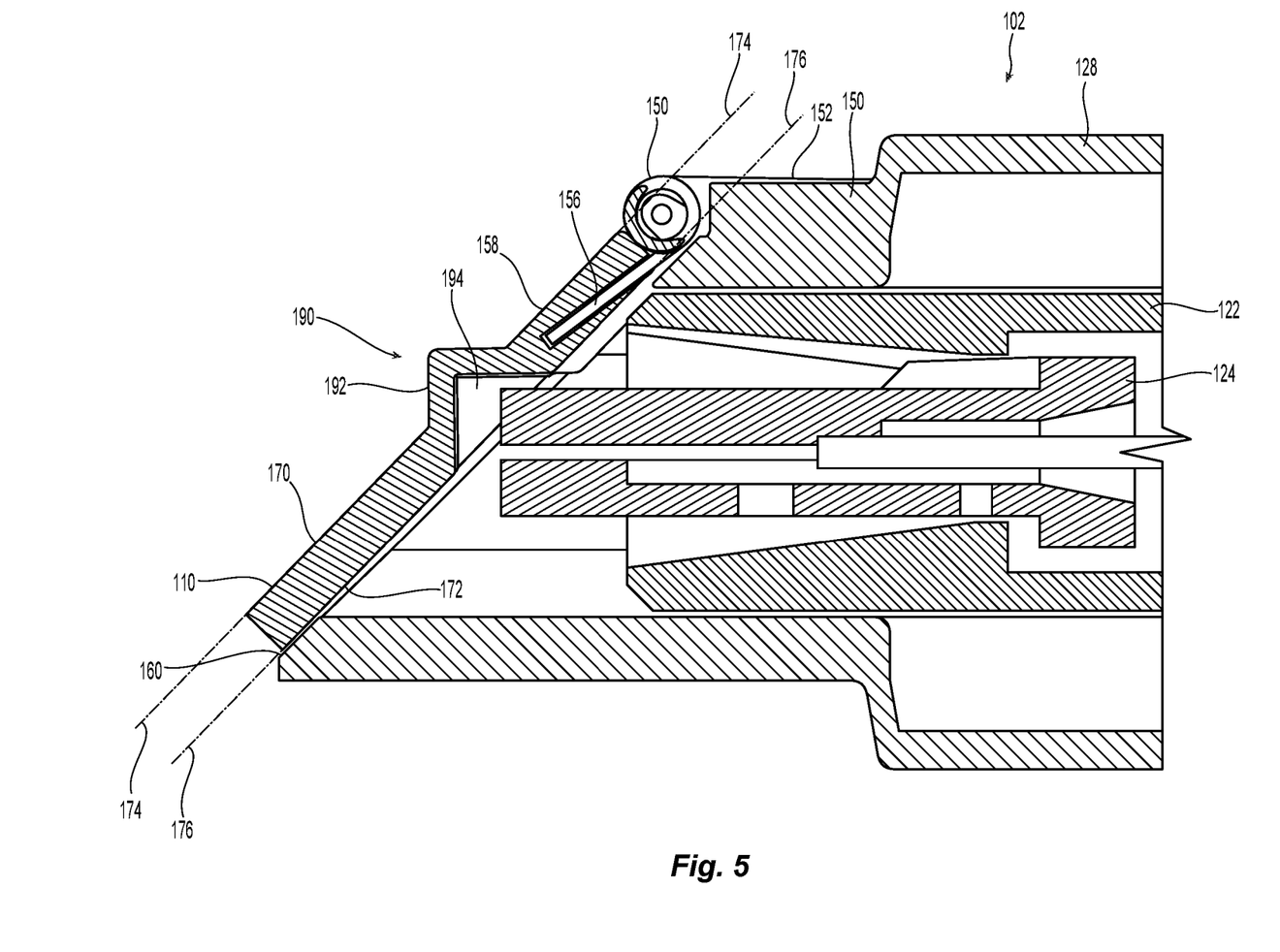
FIG. 5 is an elevational view of a cross section of a portion of the fiber optic connector in FIG. 1.

The shroud 128 has a front face 160 that surrounds the shroud 128. The front face 160 also functions as stop surface and as a fiber optic connector shutter 110 stop surface as well. The front face 160 of the shroud 128 is at an angle of about 45 degrees to an axis through the fiber optic connector 102 (along the optical fibers 126) but could be disposed at other angles as well. As can be seen in FIGS. 1 and 5, the fiber optic connector shutter 110 rests on the front face 160 when disengaged from the adapter 104. This arrangement provides the dust and debris elimination function for the fiber optic connector 102. Any dust or debris that falls on the fiber optic connector 102 or on the fiber optic connector shutter 110 does not end up on the end face of the fiber optic ferrule 124. The front face 160 also engages the adapter stop surfaces 138 in the opening 130 when the fiber optic connector 102 is inserted into the adapter 104. See, e.g., FIG. 2. This will be described in more detail below.

Figure 3:
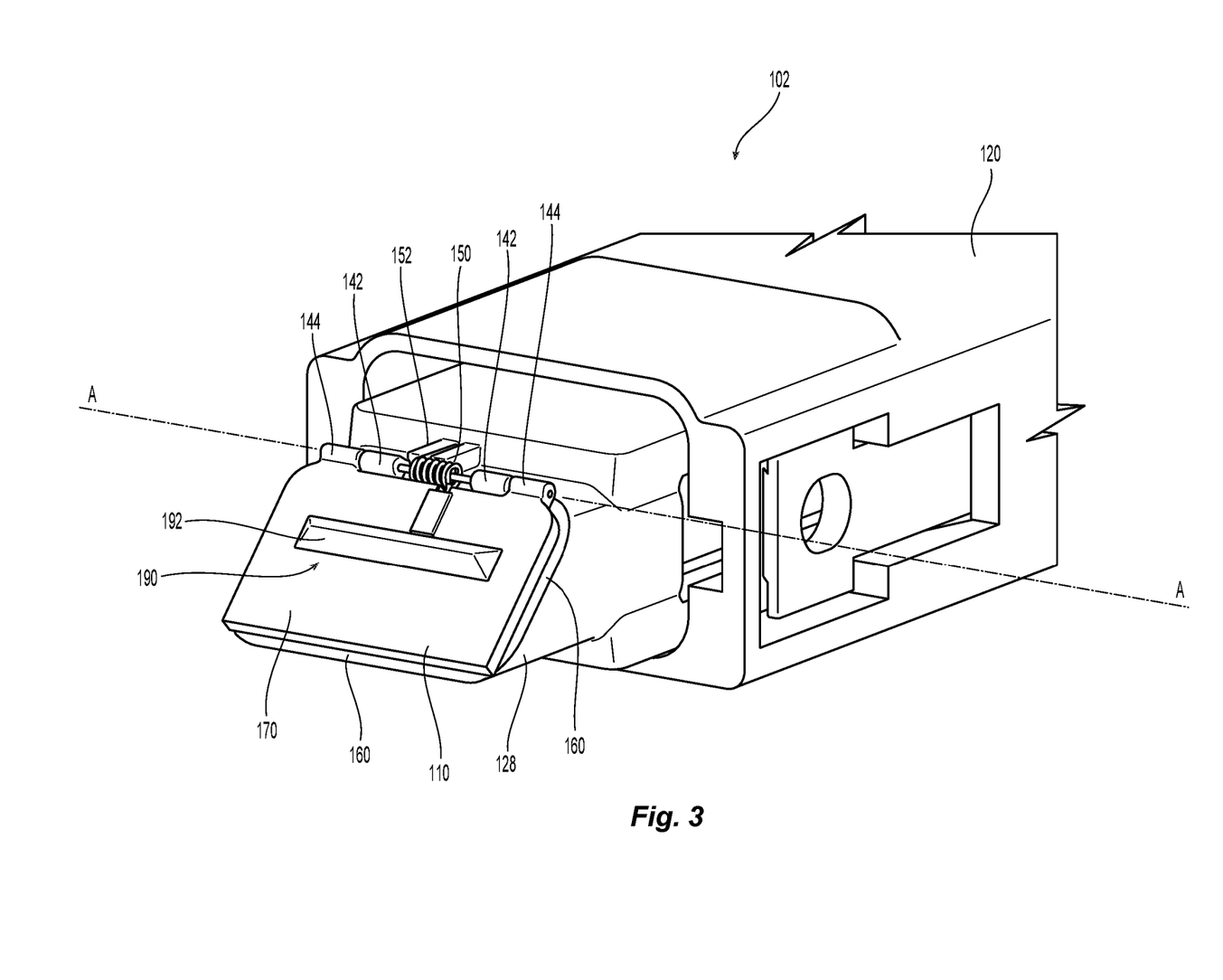
FIG. 3 is a perspective view of the fiber optic connector in FIG. 1 from the front.
Figure 4:
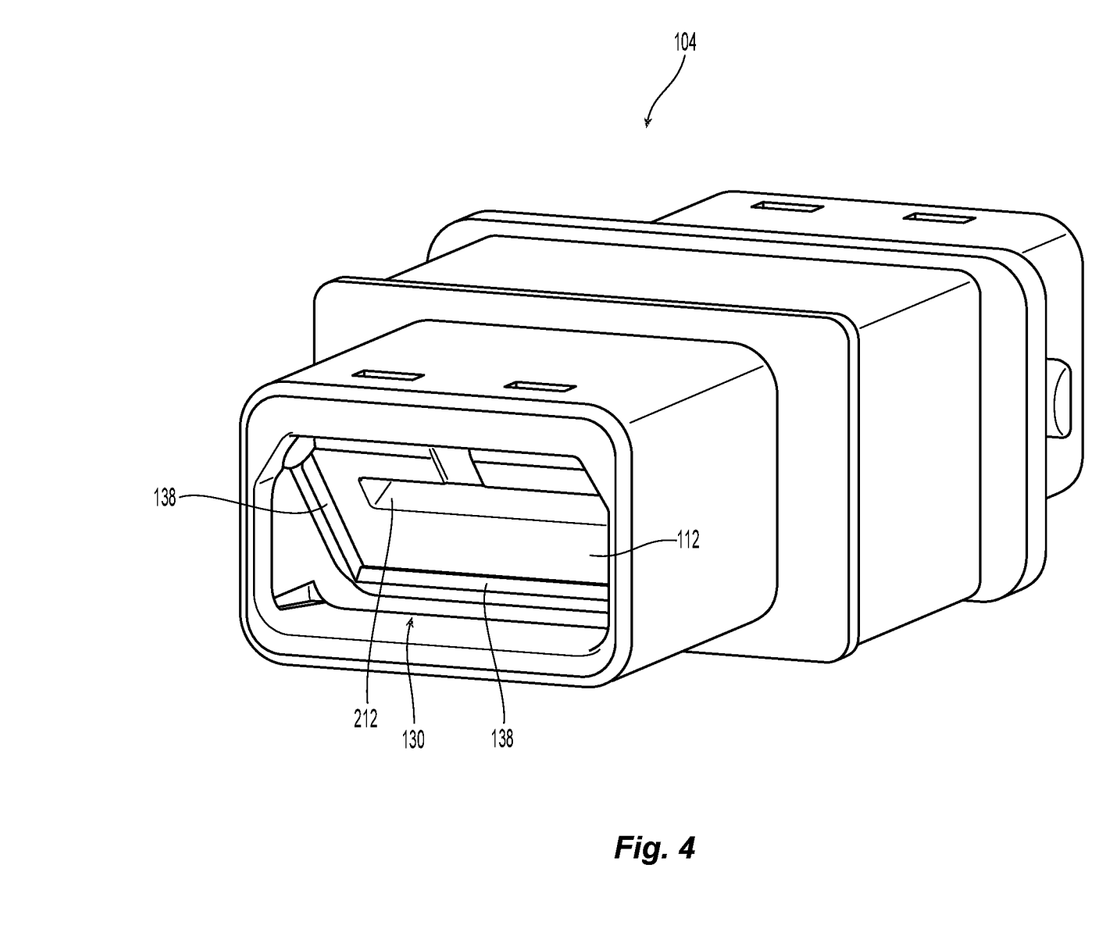
FIG. 4 is a perspective view of the adapter in FIG. 1 from the front.
Figure 9:
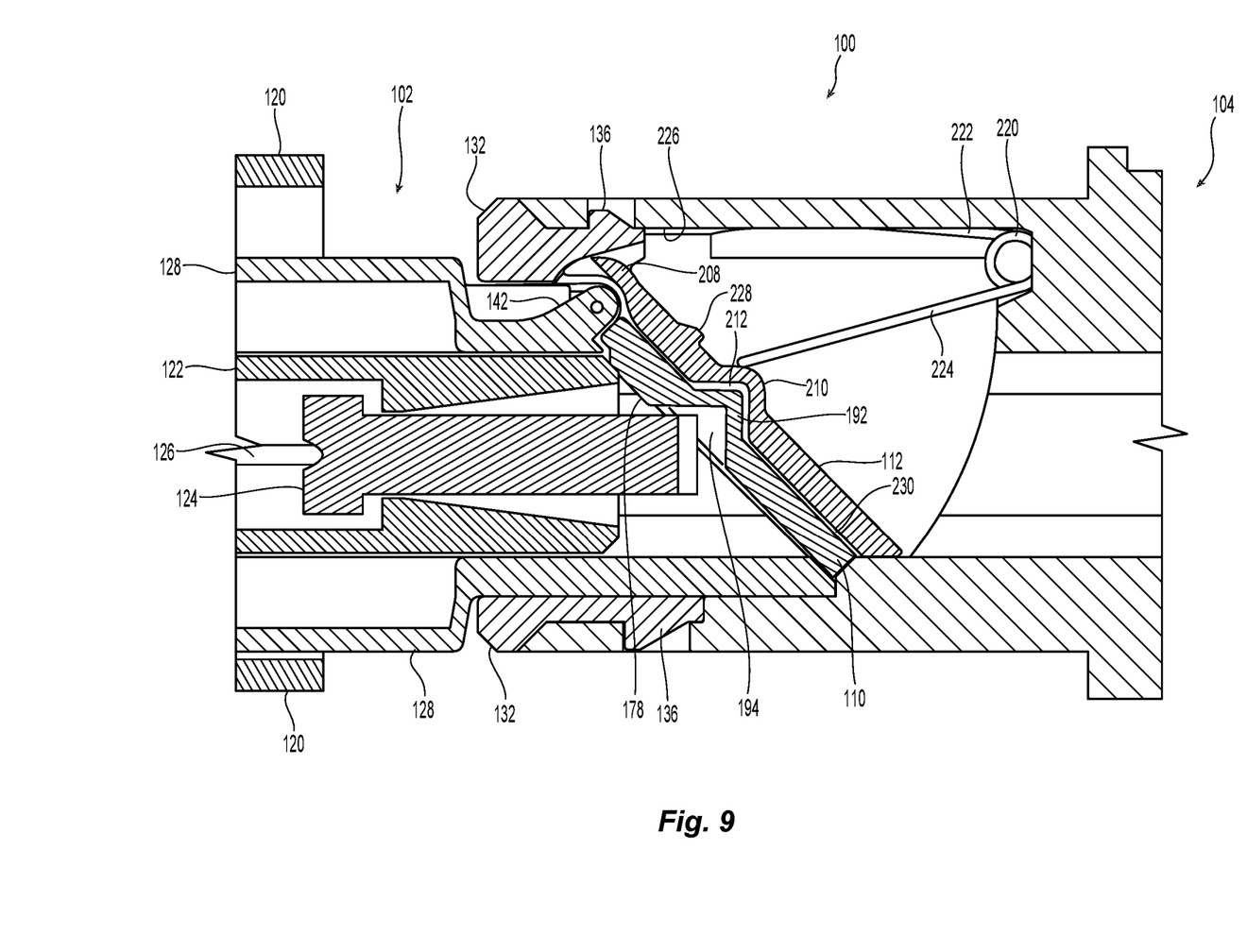
FIG. 9 is an elevational view of a cross section of a portion of the fiber optic connector and adapter in FIG. 1 as they engage one another.

Looking at FIGS. 3, 5, and 9 in particular, the fiber optic connector shutter 110 has an outer surface 170 and an inner surface 172. The majority of the outer surface 170 lies in an outer surface plane 174, while the majority of the inner surface 172 lies in an inner surface plane 176. There may be some structures that do not lie on the inner and outer surface planes 174, 176. For example, the shutter door opening 158 for the spring element 150 may provide some structure that prevents it from lying in the outer surface plane 174. While the majority of the inner surface 172 lies on the inner surface plane 176, there may also be pads 178 on the inner surface 172 that extend away from the inner surface 172. The pads 178 are used by the fiber optic connector 102 during insertion into the adapter to rotate the fiber optic connector shutter 110 out of the way of the fiber optic ferrule 124.

Another structure that does not lie on the inner and outer surface planes 174, 176 is a notch 190 on the fiber optic connector shutter 110. As noted above, the notch 190 will engage a similar structure on the adapter shutter 112 to move in unison and to capture the dust and debris therebetween. The notch 190 has an outer portion 192 extending forward from the outer surface 170 and beyond the outer surface plane 174. The notch 190 also has a corresponding inner indentation 194 extending into the fiber optic connector shutter 110 forward of the inner surface plane 176. The inner indentation 194 corresponds to a front portion of the fiber optic ferrule 124. As will be realized, when the fiber optic connector 102 is inserted into the adapter 104, an upper portion of the inner housing 122 engages the fiber optic connector shutter 110, and the pads 178 in particular and causes the fiber optic connector shutter 110 to rotate about the first axis A. See FIGS. 9 and 10.

Figure 6:
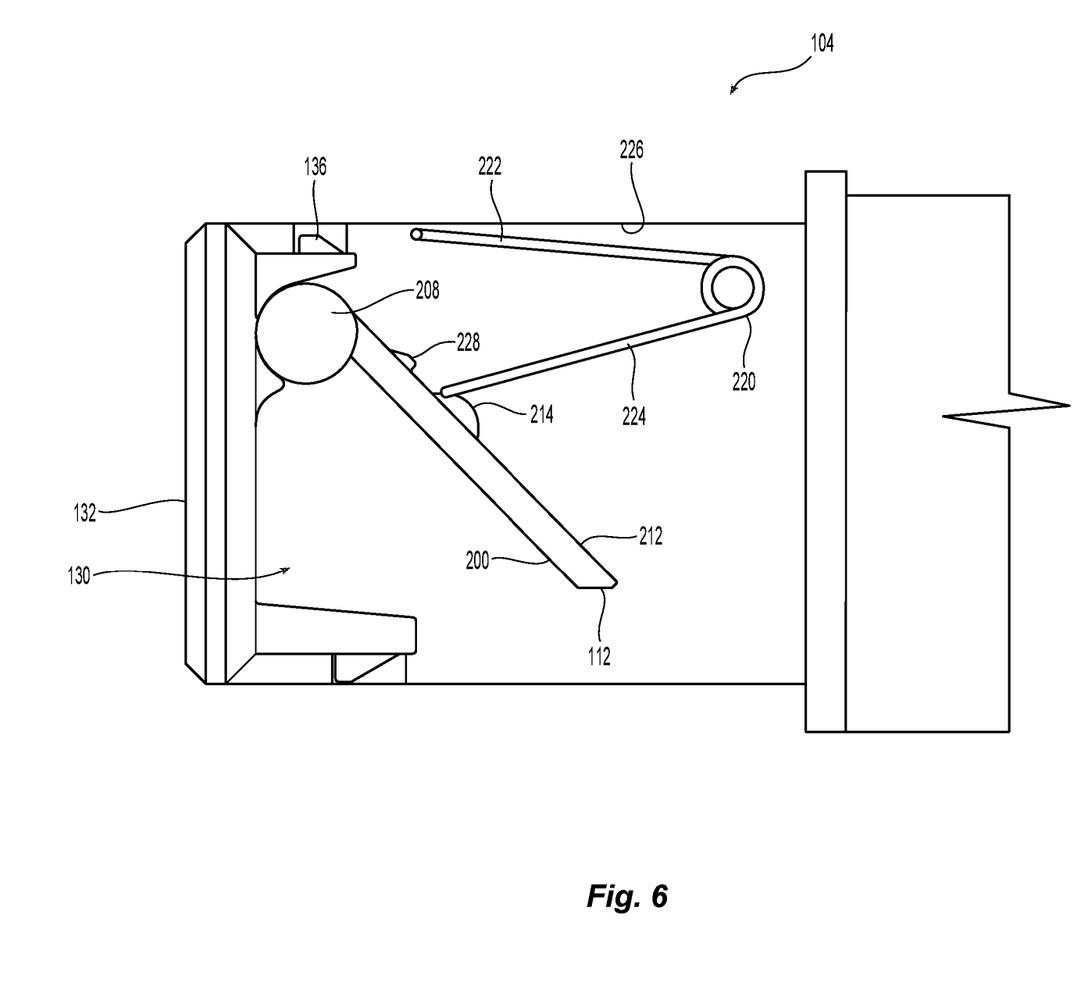
FIG. 6 is a side elevational view of the adapter in FIG. 1.
Figure 7:
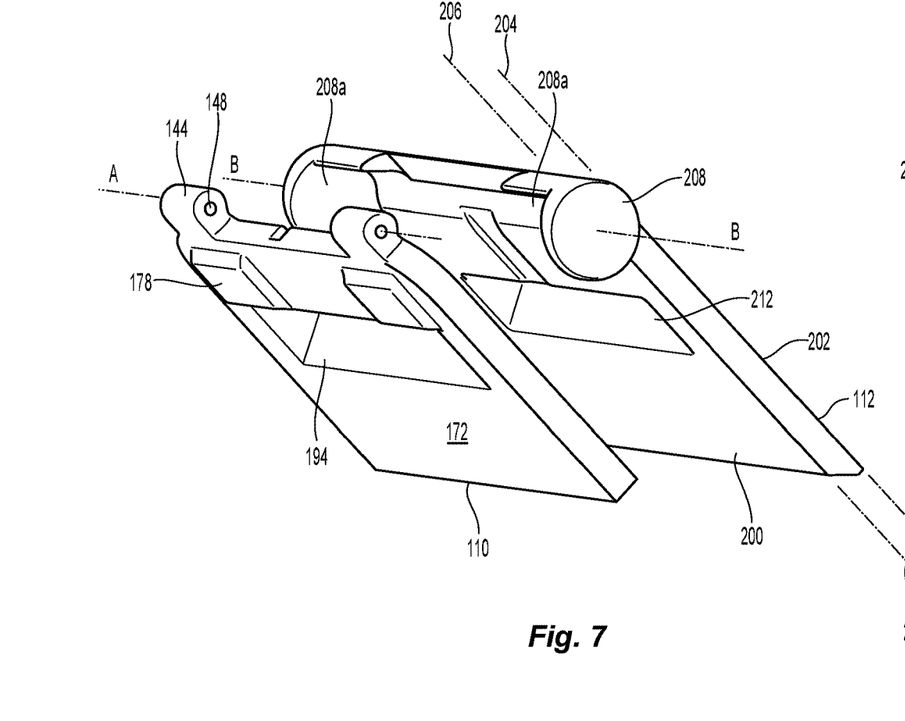
FIG. 7 is a side perspective view of the shutters for the fiber optic connector and adapter in FIG. 1.
Figure 8:
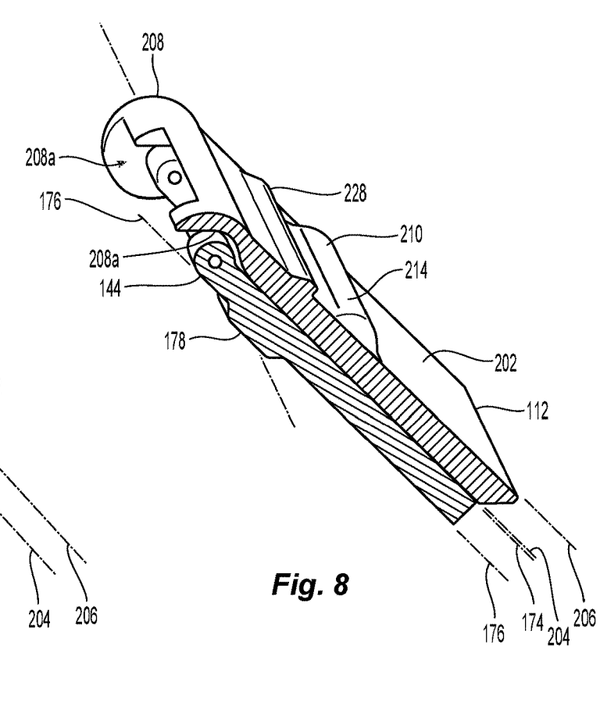
FIG. 8 is a side perspective view of a cross section of the shutters for the fiber optic connector and adapter in FIG. 7.

Turning now to FIGS. 6, 7, and 9 in particular, the adapter 104 and the adapter shutter 112 will be discussed. The adapter shutter 112 has an outer surface 200 and an inner surface 202, the outer surface 200 has an outer surface plane 204 and the inner surface 202 has an inner surface plane 206. At the top of the adapter shutter 112 is generally circular pivot 208 that is disposed in a cavity in the adapter 104 and in the chamfered front portion 134 in particular. The generally circular pivot 208 rotates about a second axis B within the adapter 104. The generally circular pivot 208 has a groove 208A (see FIGS. 7 and 8) to receive shroud pivot sleeves 140 and shutter pivot sleeves 142 of the fiber optic connector shutter 110.

The adapter shutter 112 also has a notch 210 that has an indentation 212 extending from the outer surface 200 into the adapter shutter 112 rearwardly of the outer surface plane 204 and a corresponding inner projection 214 extending from the inner surface 202 rearwardly beyond the inner surface plane 206 and into the opening 130 of the adapter 104. Preferably the configuration of the indentation 212 corresponds to configuration of the notch 190 on the fiber optic connector shutter 110 and the outer portion 192 in particular. This allows the fiber optic connector shutter 110 and the adapter shutter 112 to nest and capture the dust and debris between the two shutters. Although only one notch 210 and only one notch 190 are shown and discussed herein, it will be appreciated that there could be more than one.

The adapter 104 also includes a spring element 220, a torsion spring is illustrated but other resilient elements could be used, that has two arms 222,224 to bias the adapter shutter 112 in a closed position. The first arm 222 engages an inside surface 226 of the adapter 104, while the second arm 224 engages the projection 214 on the inner surface 202 of the adapter shutter 112. There may also be a spring stop 228 extending from the inner surface 202 of the adapter shutter 112. As the adapter shutter 112 rotates into the adapter 104, the spring arm 224 rides up the inner projection 214 until it engages the spring stop 228.

The mating of the fiber optic connector 102 with the adapter 104 and the movement of the fiber optic connector shutter 110 and an adapter shutter 112 will be discussed with reference to FIGS. 9-11. As the fiber optic connector shutter 110 and shroud 120 of the fiber optic connector 102 enter the opening 130 of the adapter 104, the upper portion of inner housing 112 makes contact with the fiber optic connector shutter 110 and the pads 178 as shown in FIG. 9. The fiber optic ferrule 124 is disposed within the inner indentation 194. The shroud 128 has made contact with the adapter stop surfaces 138, preventing the shroud 128 from moving forward and into the adapter 104 any farther. However, inner housing 122 in the fiber optic ferrule 124 can still move forward into the adapter 104. At this point, the shroud pivot sleeves 142 and the shutter pivots sleeves 144 have moved into the groove 208A of the circular pivot 208, thereby aligning first axis A with second axis B. At the same time, the outer portion 192 of the notch 190 on fiber optic connector shutter 110 is disposed within the indentation 122 of the notch 210 of the adapter shutter 112. The two outer surfaces 170, 200 of the fiber optic connector shutter 110 and the adapter shutter 112, respectively, are adjacent to one another and in close proximity. The fiber optic connector shutter 110 and the adapter shutter 112 have space 230 where the dust and debris are captured during the insertion and removal of the fiber optic connector 102 from the adapter 104. The fiber optic connector shutter 110 and the adapter shutter 112 now rotate about a combined first axis A and second axis B that forms a rotation axis. It should be noted that the fiber optic connector shutter 110 and an adapter shutter 112 could have different configurations to allow for a larger and/or smaller space 230 therebetween. It is also envisioned that the fiber optic connector shutter 110 and an adapter shutter 112 could have separate axes of the rotation, but the fiber optic connector shutter 110 and an adapter shutter 112 should always move in unison with one another to prevent the dust and debris from contaminating a joining point or area of the fiber optic connectors 102.

Figure 10:
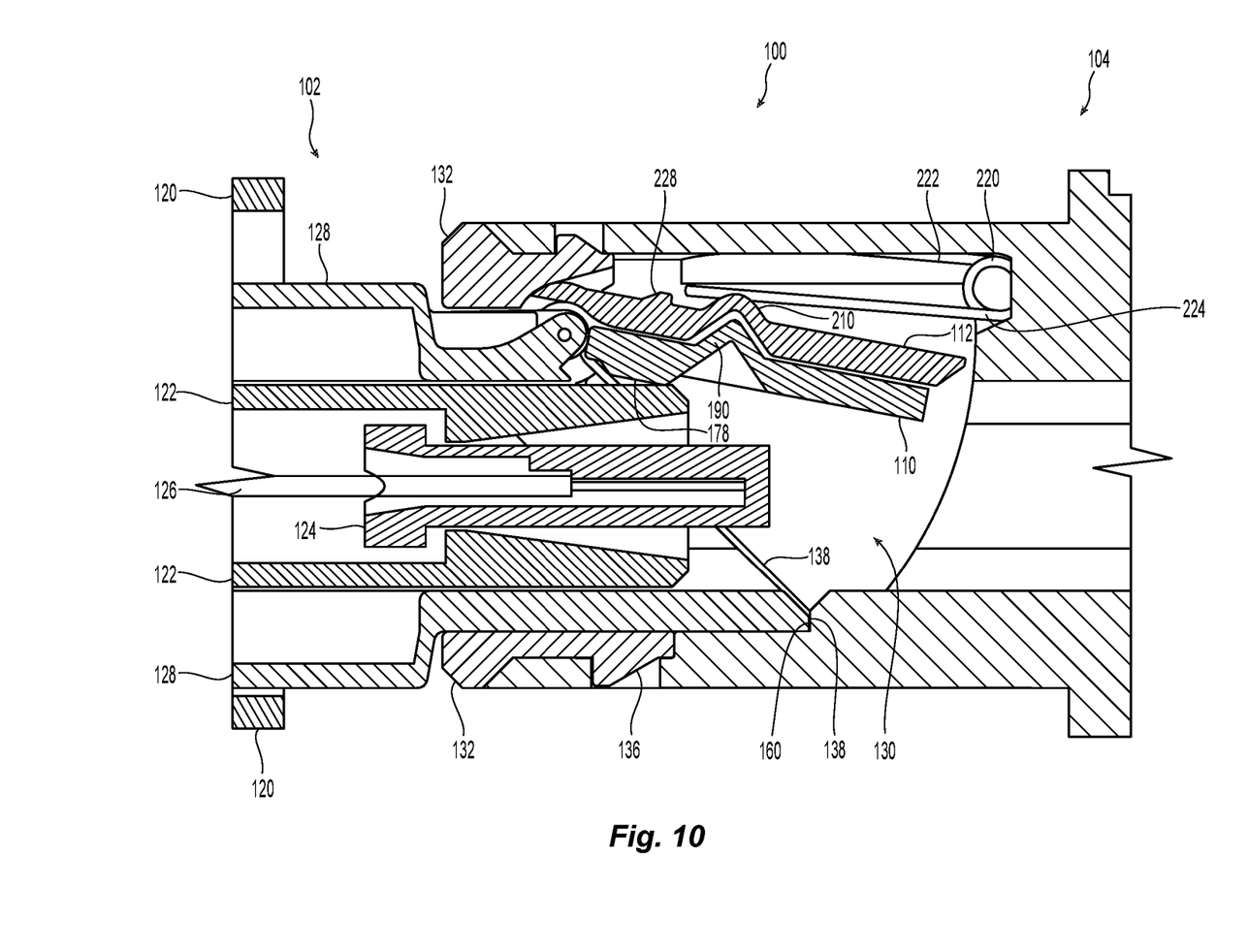
FIG. 10 is an elevational view of a cross section of a portion of the fiber optic connector and adapter in FIG. 1 as the shroud and adapter engage one another.

In FIG. 10, the fiber optic connector 102 has been inserted farther into the adapter 104. The fiber optic connector shutter 110 and an adapter shutter 112 continue to rotate about the rotation axis and up and out of the way of the inner housing 122 and fiber optic ferrule 124. It should be noted that while the fiber optic connector shutter 110 and an adapter shutter 112 are disposed on the top of the fiber optic connector 102 and the adapter 104, they can also be disposed on the bottom thereof.

Figure 11:
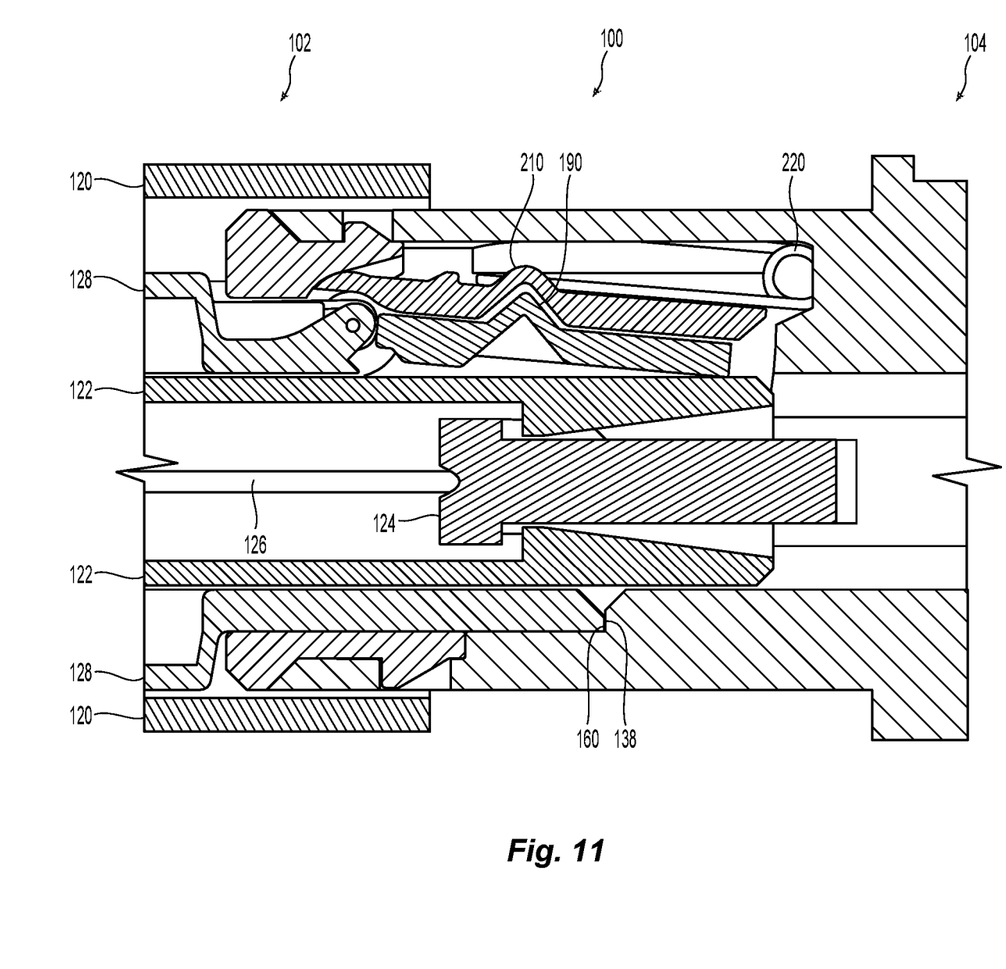
FIG. 11 is an elevational view of a cross section of a portion of the fiber optic connector and adapter in FIG. 1 as the shutters have rotated out of the way.

The inner housing 122 and fiber optic ferrule 124 have been inserted past the shutters 110,112 in FIG. 11. The fiber optic ferrule 124 can now be mated with another fiber optic ferrule or optical component in a dust and debris-free environment.

Figure 12A:
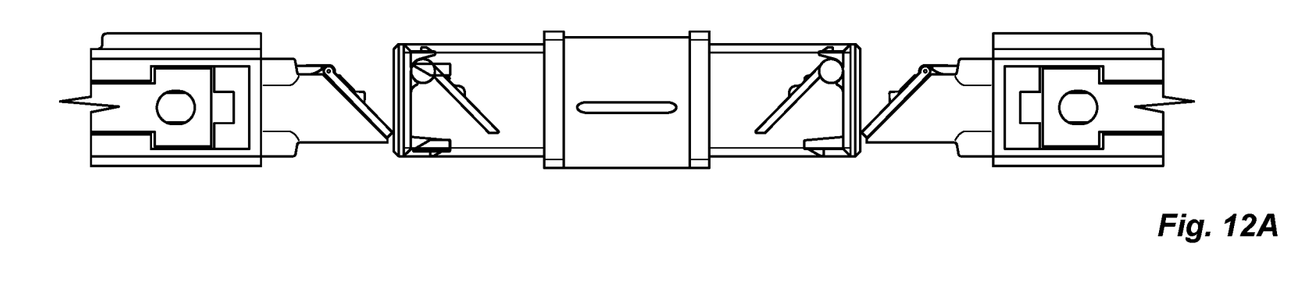
FIG. 12A is a side elevational view of two fiber optic connectors just before entering an adapter from FIG. 1.
Figure 12B:
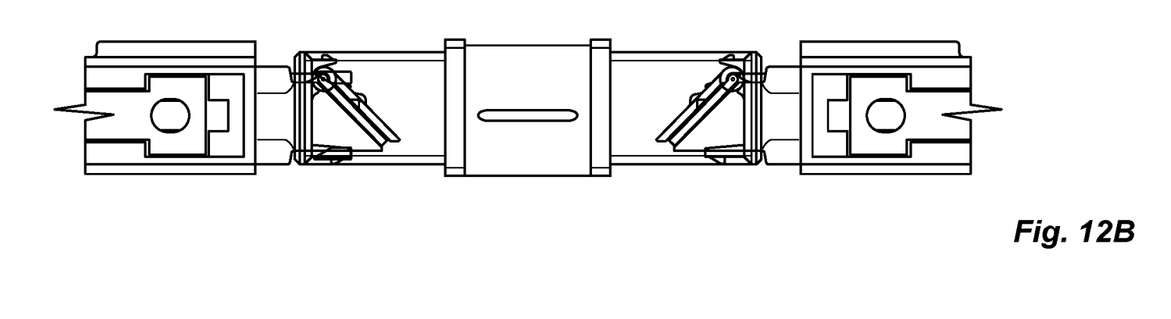
FIG. 12B is a side elevational view of the two fiber optic connectors in the adapter and the two shutters engaging one another.
Figure 12C:
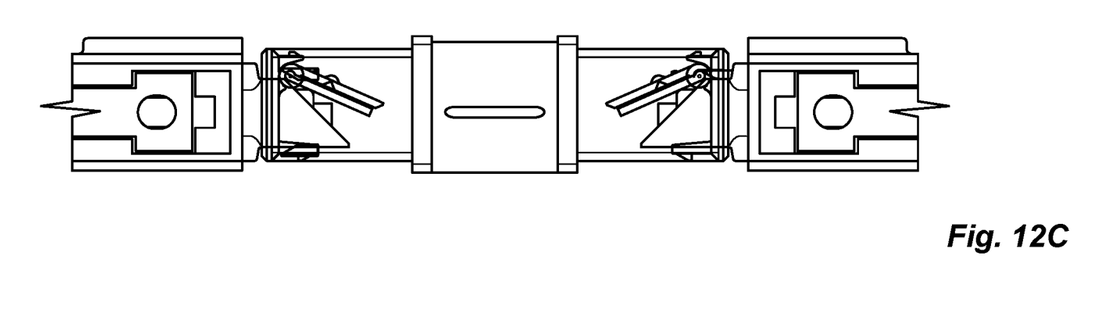
FIG. 12C is a side elevational view of two fiber optic connectors farther into the adapter and the shutters rotated out of the way.
Figure 12D:
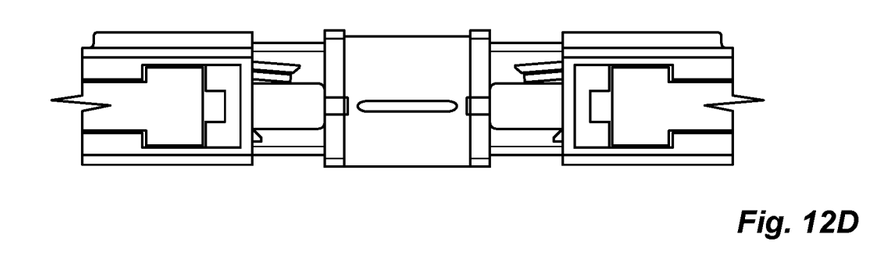
FIG. 12D is a side elevational view of two fiber optic connectors just prior to engaging guide pins to align the fiber optic connectors with the shutters completely out of the way.
Figure 12E:
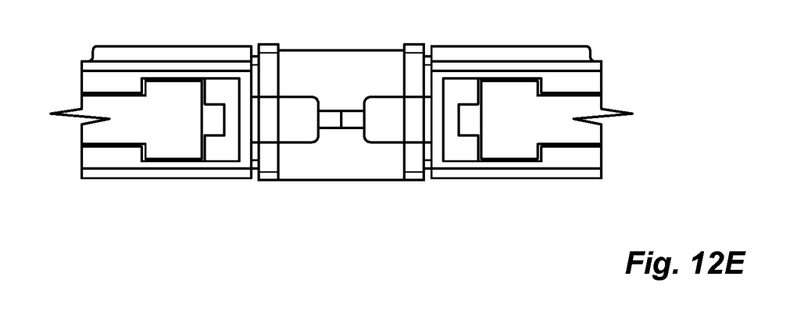
FIG. 12E is a top elevational view of two fiber optic connectors engaging one another.

Illustrated in FIGS. 12A-12E is the progression of the insertion of the fiber optic connector 102 into the adapter 104 (or the unmating of the fiber optic connector 102 and the adapter 104 if viewed in reverse). In FIG. 12A, the shroud 128 of fiber optic connectors 102 approach the ends of an adapter 104. In FIG. 12B, the fiber optic connector shutters 110 and an adapter shutters 112 have engaged one another and the shrouds 128 have made contact with the adapter stop surfaces 138 in the adapter. In FIG. 12C, the inner housings 122 have contacted the pads 178 on the inner surface 172 of the fiber optic connector shutters 110. In FIG. 12D, the inner housings 122 have moved past the shutters and are approaching the guide pins (or other structures in the adapter) to assist in aligning the fiber optic connectors 102. FIG. 12E shows the fiber optic connectors 102 are in a mated condition in a clean environment.

While the shutters have been illustrated as moving and rotating towards the adapter, it is also possible that the shutters rotate towards the fiber optic connector as well.

It will be apparent to those skilled in the art that various modifications and variations can be made to the present invention without departing from the spirit and scope of the invention. Thus it is intended that the present invention cover the modifications and variations of this invention provided they come within the scope of the appended claims and their equivalents.

What is claimed:

1. A shutter for a fiber optic connector, the fiber optic connector having a shroud disposed at a front end thereof between a portion of an inner connector housing and an outer connector housing comprising:

a fiber optic connector shutter rotatably mounted to the shroud about a first axis, the fiber optic connector shutter having an outer surface and an inner surface, the outer surface having an outer surface plane and the inner surface having an inner surface plane; and a notch in the fiber optic connector shutter, the notch having an outer portion extending forward from the outer surface beyond the outer surface plane and a corresponding inner indentation extending into the fiber optic connector shutter forward of the inner surface plane.

2. The shutter for a fiber optic connector according to claim 1, wherein the notch is configured to receive a portion of a fiber optic ferrule from the fiber optic connector in the inner indentation.

3. The shutter for a fiber optic connector according to claim 1, wherein the shroud has a stop surface to engage an adapter stop surface.

4. The shutter for a fiber optic connector according to claim 1, wherein the notch engages a portion of an adapter shutter in an adapter into which the fiber optic connector is inserted.

5. The shutter for a fiber optic connector according to claim 1, wherein a portion of the inner connector housing engages the fiber optic connector shutter to rotate the fiber optic connector shutter when the inner connector housing moves relative to the shroud.

6. The shutter for a fiber optic connector according to claim 1, wherein the shroud is attached to a portion of the fiber optic connector.

7. The shutter for a fiber optic connector according to claim 1, wherein the shroud has pivot sleeves and the fiber optic connector shutter has pivot sleeves, the shroud pivot sleeves and the fiber optic connector shutter pivot sleeves receiving a pin therethrough to rotatably attach the fiber optic connector shutter to the fiber optic connector along a first axis.

8. The shutter for a fiber optic connector according to claim 4, wherein the fiber optic connector shutter and the adapter shutter rotate about the same axis as the fiber optic connector is inserted into the adapter.

9. The shutter for a fiber optic connector according to claim 4, wherein the fiber optic connector shutter and the adapter shutter are adjacent to one another and move together when the fiber optic connector and adapter are mated.

10. The shutter for a fiber optic connector according to claim 4, wherein the adapter shutter has a groove to receive pivot sleeves on the shroud and pivot sleeves on the fiber optic connector shutter.

11. A shutter system to prevent dust from entering a fiber optic connector and an adapter comprising:
  a fiber optic connector shutter rotatably mounted to the fiber optic connector between a portion of an inner connector housing and an outer connector housing, the fiber optic connector shutter rotatable about a first axis; and
  an adapter shutter rotatably mounted to the adapter, the adapter shutter rotatable about a second axis, the fiber optic connector shutter and the adapter shutter being adjacent to one another and moving together when the fiber optic connector and the adapter are mated, and wherein the first axis and the second axis align along a rotation axis when the fiber optic connector and the adapter are mated.

12. The shutter system according to claim 11, further comprising a shroud, the shroud disposed at a front end of the fiber optic connector and the fiber optic connector shutter is rotatably attached to the shroud.

13. The shutter system according to claim 11, wherein the fiber optic connector shutter has an outer surface and an inner surface, the outer surface has an outer surface plane and the inner surface having an inner surface plane, and
  wherein the fiber optic connector shutter has a notch, the notch having an outer portion extending forward from the outer surface beyond the outer surface plane and a corresponding inner indentation extending into the fiber optic connector shutter forward of the inner surface plane.

14. The shutter system according to claim 13, wherein the adapter shutter has an adapter shutter notch configured to receive at least a portion of the notch in the fiber optic connector shutter.

15. The shutter system according to claim 14, wherein the adapter shutter has an outer surface and an inner surface, the outer surface has an outer surface plane and the inner surface having an inner surface plane, and
  wherein the adapter shutter notch has an indentation extending rearwardly from the outer surface into the adapter shutter rearwardly of the outer surface plane and a corresponding inner portion extending rearwardly from the inner surface beyond the inner surface plane and into the adapter.

16. A shutter system to prevent dust from entering a fiber optic connector and an adapter comprising:
  a fiber optic connector shutter rotatably mounted to the fiber optic connector, the fiber optic connector shutter rotatable about a first axis; and
  an adapter shutter rotatably mounted to the adapter, the adapter shutter rotatable about a second axis, the fiber optic connector shutter and the adapter shutter being adjacent to one another and moving together when the fiber optic connector and the adapter are mated,
  wherein the first axis and the second axis align along a rotation axis when the fiber optic connector and the adapter are mated.

* * * * *